United States Patent
Runzheimer et al.

Patent Number: 4,687,853
Date of Patent: Aug. 18, 1987

[54] IMIDAZO[1,5-A]PYRIDYLMETHANES

[76] Inventors: Hans-volker Runzheimer, Miles Laboratories, Inc. 1127 Myrtle St., Elkhart, Ind. 46514; Ulrich Nehen; Gert Jabs, both of Bayer AG, D 5090 Leverkusen, Fed. Rep. of Germany

[21] Appl. No.: 709,623

[22] Filed: Mar. 8, 1985

[30] Foreign Application Priority Data

Mar. 15, 1984 [DE] Fed. Rep. of Germany ....... 3409440

[51] Int. Cl.$^4$ .................. C07D 471/04; C07D 401/02; B41M 3/12
[52] U.S. Cl. .................................... 546/121; 544/333; 544/61; 544/127; 544/362; 544/236; 544/295; 544/117; 427/148; 427/151; 427/146
[58] Field of Search .................. 546/121; 544/333, 61, 544/127; 427/148, 151, 146

[56] References Cited

U.S. PATENT DOCUMENTS

| | | | |
|---|---|---|---|
| 3,984,605 | 10/1976 | Kohmura et al. | 427/148 |
| 4,054,718 | 10/1977 | Garner et al. | 427/151 |
| 4,060,262 | 11/1977 | Maierson | 427/151 |
| 4,398,753 | 8/1983 | Asano et al. | 427/151 |
| 4,500,354 | 2/1985 | Katsen et al. | 427/148 |
| 4,501,745 | 2/1985 | Kaplan et al. | 546/121 |

Primary Examiner—Henry R. Jiles
Assistant Examiner—J. Richter
Attorney, Agent, or Firm—Sprung, Horn, Kramer & Woods

[57] ABSTRACT

Hetarylmethane leuco dyestuffs of the formula

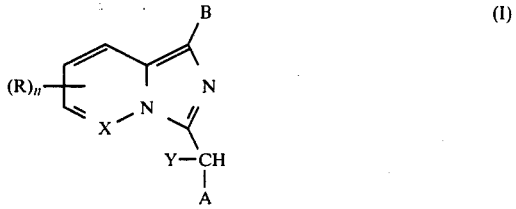

wherein
R denotes halogen, alkyl, alkoxy, aryl or aryloxy,
A denotes an aromatic-carbocyclic or -hetero-cyclic radical,
B denotes hydrogen, halogen, alkyl, aryl, alkylcarbonyl, arylcarbonyl, amino, monoalkylamino, dialkylamino, arylamino, aralkylamino or acylamino,
X denotes CH or N,
Y denotes

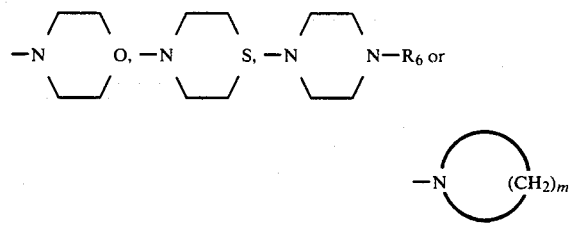

$R_6$ denotes hydrogen or alkyl,
m denotes 4–6 and
n denotes 0 and 1–4 and wherein the cyclic and acyclic radicals in turn can be substituted by nonionic radicals, are used as color formers in pressure-copyable and thermoreactive recording materials.

6 Claims, No Drawings

IMIDAZO[1,5-A]PYRIDYLMETHANES

The invention relates to hetarylmethane leuco dyestuffs of the formula

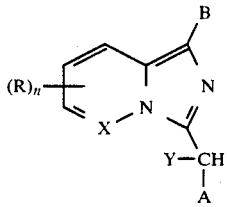
(I)

wherein
- R denotes halogen, alkyl, alkoxy, aryl or aryloxy,
- A denotes an aromatic-carbocyclic or -heterocyclic radical,
- B dnoetes hydrogen, halogen, alkyl, aryl, alkylcarbonyl, arylcarbonyl, amino, monoalkylamino, dialkylamino, arylamino, aralkylamino or acylamino,
- X denotes CH or N,
- Y denotes

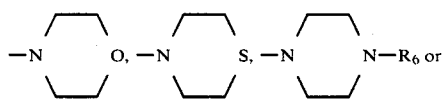

- $R_6$ denotes hydrogen or alkyl,
- m denotes 4–6 and
- n denotes 0 and 1–4 and wherein the cyclic and acyclic radicals in turn can be substituted by nonionic radicals, to their preparation and to pressure-copyable and thermoreactive recording materials containing them.

Examples of suitable nonionic radicals are halogen, hydroxyl, alkoxy, aryloxy, aralkoxy, hetaryloxy, aryl, heteraryl, alkylmercapto, arylmercapto, aralkylmercapto, cyano, carbamoyl, alkoxycarbonyl, amino which can be substituted by 1 or 2 alkyl, aryl or aralkyl groups or whose substituents can be cyclised, alkenyloxy, alkylcarbonyloxy and arylcarbonyloxy and of ring substituents also alkyl, aralkyl, nitro, alkenyl and arylvinyl.

Preferably alkyl stands for $C_1$–$C_8$-alkyl, in particular for $C_1$–$C_5$-alkyl, and alkenyl stands for $C_2$–$C_5$-alkenyl.

Halogen preferably stands for fluorine, chlorine or bromine.

For the purposes of the present invention, aryl is in particular phenyl and naphthyl, and aralkyl is benzyl and phenylethyl as well as their nonionically substituted derivatives.

Acyl is preferably acetyl, propionyl and benzoyl.

Heteraryl radicals are preferably benzofuranyl, benzoxazolyl, pyrazolinyl or pyridyl.

The aromatic radicals A can be monocyclic rings or condensed ring systems, of which 2 or more can be linked to each other directly or via a bridge. Suitable condensed rings are aromatic and saturated carbocyclic and heterocyclic 5- and 6-membered rings.

Suitable aromatic carbocyclic radicals A are members for example of the benzene, naphthalene, pyrene, anthracene, perylene and biphenyl series.

Examples of suitable heteroaromatic rings A are the thiophene, pyrrole, imidazole, oxazole, thiazole, pyrazole, pyridine and pyrimidine rings.

Examples of interesting condensed carbocyclic heterocyclic ring systems are quinoline, 1,2,3,4-tetrahydroquinoline, quinoxaline, indole, 1,2-dihydroindole, benzofuran, benzoxazole and benzodioxole.

Said rings can be substituted by the nonionic radicals given above.

Preferred compounds of the formula (I) have the formula

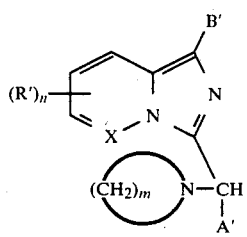
(II)

wherein
- R' denotes halogen, $C_1$–$C_5$-alkyl or $C_1$–$C_5$-alkoxy,
- R' denotes phenyl, naphthyl, pyrenyl, anthracyl, perylenyl, biphenylyl, thienyl, pyrryl, imidazolyl, oxazolyl, thiazolyl, pyrazolyl, pyridyl, pyrimidyl, quinolyl, 1,2,3,4-tetrahydroquinolyl, quionoxalyl, indolyl, 1,2-dihydroquinolyl or benzodioxolyl and
- B' denotes hydrogen, halogen, $C_1$–$C_5$-alkyl, phenyl, $C_1$–$C_4$-alkylcarbonyl, benzoyl, mono- or di-$C_1$–$C_5$-alkylamino or phenylamino, the alkyl radicals and the cyclic radicals can be substituted by fluorine, chlorine, bromine, hydroxyl, $C_1$–$C_8$-alkoxy, phenoxy, benzyloxy, pyridyloxy, phenyl, pyrazolinyl, benzoxazolyl, benzofuranyl, triazolyl, $C_1$–$C_4$-alkylmercapto, phenylmercapto, benzylmercapto, cyano, carbamoyl, $C_1$–$C_4$-alkoxycarbonyl, amino, which in turn can be substituted by 1 or 2 $C_1$–$C_4$-alkyl, phenyl, benzyl or phenethyl groups, $C_2$–$C_4$-alkenyloxy, $C_1$–$C_4$-alkylcarbonyloxy or benzoyloxy, and the cyclic radicals can additionally be substituted by nitro, $C_1$–$C_4$-alkyl, benzyl, $C_2$–$C_6$-alkenyl or styryl, and m and n are as defined in the formula (I).

Specific examples of the heterocyclic species mentioned under A' are: thien-2-yl, thien-3-yl, pyrr-2-yl, imidazol-4-yl, isoxazol-3-yl, isoxazol-5-yl, thiazol-2-, -4- and -5-yl, pyrazol-4-yl, pyrid-2-, -3- and -4-yl, and pyrimid-2- and -4-yl.

Noteworthy among compounds of the formula (II) are those where B'=$CH_3$ and m=5 and among these in turn those where X=CH and n=0 or 1.

Particularly preferred compounds have the formula

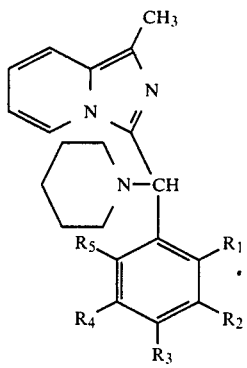

wherein

R$_1$ and R$_5$ stand for hydrogen, C$_1$–C$_4$-alkyl, phenyl, benzyl, C$_1$–C$_4$-alkoxy, C$_2$–C$_4$-alkenyloxy, phenoxy, C$_1$–C$_4$-alkylcarbonyl, benzoyl, chlorine or bromine, R$_2$ and R$_4$ stand for hydrogen, C$_1$–C$_4$-alkyl, phenyl, benzyl, C$_1$–C$_4$-alkoxy, phenoxy, chlorine, bromine or amino which can be substituted by 1 or 2 C$_1$–C$_4$-alkyl, phenyl, benzyl or phenethyl groups, R$_3$ stands for hydrogen, C$_1$–C$_4$-alkyl, phenyl, benzyl, C$_1$–C$_8$-alkoxy, phenoxy, pyridyloxy, benzyloxy, phenylpyrazolinyl, chlorophenylpyrazolinyl, biphenylylpyrazolinyl, benzoxazolyl, benzofuranyl, 1,2,3-triazolyl, phenylvinyl, cyano, chlorine, bromine, C$_1$–C$_4$-alkoxycarbonyl, C$_1$–C$_4$-alkoxycarbonyl- or phenoxycarbonyl-C$_1$–C$_4$-alkoxy, nitro, amino which can be substituted by 1 or 2 C$_1$–C$_4$-alkyl, phenyl, benzyl or phenethyl groups and the radicals on nitrogen can in turn be substituted by chlorine, cyano or phenyl, or strands for C$_1$–C$_4$-alkylmercapto or phenylmercapto, or R$_1$ and R$_2$, together with the benzene ring to which they are bonded, stand for naphthyl or anthracyl, or R$_1$, R$_2$, R$_4$ and R$_5$, together with the benzene ring to which they are bonded, stand for optionally chlorine-substituted anthracyl, or R$_1$, R$_2$ and R$_3$, together with the benzene ring to which they are bonded, stand for pyrenyl, or R$_2$ and R$_3$, together with the benzene ring to which they are bonded, stand for benzodioxole.

Very particularly preferred colour formers have the formula

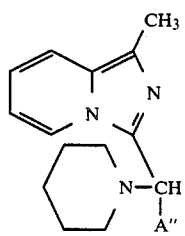
(IV)

wherein

A″ stands for the radicals

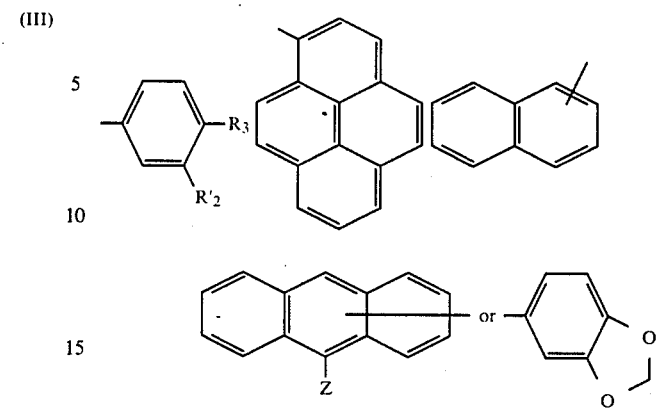
(III)

R′$_2$ stands for hydrogen, methoxy, ethoxy, methyl or ethyl,

Z stands for hydrogen or chlorine, and

R$_3$ is as defined in the formula (III).

The compounds of the formula (I) are prepared by reacting imidazo[1,5-a]pyridine or imidazo[1,5-b]pyridazinyl compounds of the formula

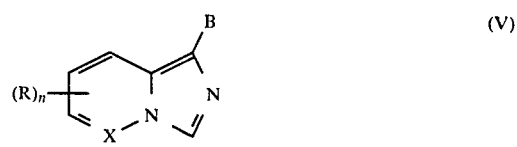
(V)

or

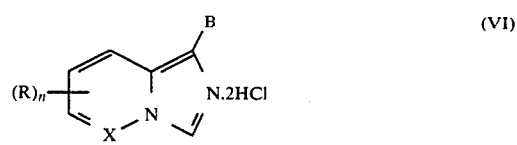
(VI)

wherein

X, R, n and B are as defined above, with aldehydes of the formula $$O=CH-A \qquad (VII)$$

and bases of the formula $$YH \qquad (VIII)$$

where

A and Y are as defined above.

The reaction can be effected in the absence of a solvent by melting the 3 components within the temperature range 60°–180° C., preferably at 100° C., in the presence of an acid condensing agent or, more conveniently, in an organic solvent under refluxing conditions. The reaction is preferably carried out in the presence of an acid condensing agent such as, for example, lower aliphatic carboxylic acids, such as formic acid or acetic acid, or inorganic acids, such as, for example, hydrochloric acid, sulphuric acid, phosphoric acid or perchloric acid. The acid condensing agents are preferably used in association with pyrrolidine or piperidine.

Examples of solvents which can be used are cycloaliphatic and aromatic hydrocarbons such as cyclohexane, benzene, toluene or xylene, chlorinated hydrocarbons, such as chloroform, ethylene chloride or chlorobenzenes; ethers, such as diethyl ether or glycol dimethyl ether, cyclic ethers, such as dioxane or tetrahydrofuran, lower aliphatic alcohols, such as methanol, ethanol or isopropanol, alkylene glycol monoalkyl ethers, such as ethylene glycol monomethyl ether or ethyl ether, dimethylformamide, diethylformamide, dimethyl sulphoxide, N-methylpyrrolidone, tetramethylene sulphone and acetonitrile.

The compounds of the formulae (V) and (VI) can be prepared by methods described in the literature, for example from 2-acetylpyridine by reaction with hydroxylamine and reduction of the resulting isomeric oxime mixture to an isomeric 1-(2-pyridyl)-1-aminoethane mixture (cf. JACS 68, 2400 (1946)). This mixture of isomers can be, for example, formylated and then reacted with acid halides or acids to form the heterocyclic structure of the formulae (V) or (VI), in which B=$CH_3$ (cf. J. Chem. Soc. 1955, 2834; Diss. Abstr. B. 1968, 547).

The starting aldehydes of the formula (VII) have been described in the literature and were prepared using methods described in the literature (see for example J. Org. Chem. 30, 3714 (1965), DE-B No. 1,060,375, U.S. Pat. No. 2,558,285).

The colour formers of the formulae (I) to (IV), if obtained in the form of crystals, are normally colourless or slightly coloured. If these compounds are brought into contact with a preferably acid developer, for example with an electron acceptor, the result is, depending on the meaning of A in the formula (I), a deep yellow, orange, red, violet, blue or green colour which is highly resistant to sublimation and light. These compounds are also particularly useful if mixed with other known colour formers, for example with 3,3-(bis-aminophenyl)phthalides, 3,3-(bis-indolyl)phthalides, 3-aminofluoranes, 2,6-diaminofluoranes, leucoauramines, spiropyrans, spirodipyrans, chromenoindoles, phenoxazines, phenothiazines, carbazolylmethanes or other triarylmethane leuco dyestuffs to produce blue, navy, grey or black colours.

The developers or recipients can be inorganic compounds such as acid clays, activated clays, attapulgite, bentonite, montmorillonite, zeolite, alumina, Silton clay, silica gel, aluminium salts or zinc salts and organic products such as polyvalent metal salts of aromatic carboxylic acids and esters, in particular zinc salicylates or maleates formaldehyde resins or phenolic polymers, in particular p-substituted phenols reacted with formaldehyde, which can contain zinc.

The colour formers or colour-conferring agents of the formulae (I) to (IV) can be used for pressure- and heat-sensitive recording materials, in particular for reactive duplicating papers.

Reactive duplicating papers are known (cf. M. Gutcho, Capsule Technology and Microencapsulation, Noyes Data Corporation, 1972, pages 242–277; G. Baxter, Microencapsulation, Processes and Applications, edited by J. E. Vandegaer, Plenum Press, New York, London, pages 127–143).

The colour formers are preferably incorporated into microcapsules in which they are contained in dissolved form.

Reactive duplicating papers preferably consist of two or more loosely juxtaposed sheets of paper of which the top sheet always contains a conferrer layer on the back and the bottom sheet always contains a recipient layer on the front. The conferrer layer contains the microcapsules, the core material of which is a solution of the colour former in an organic solvent. The recipient layer contains the developer. On writing, the capsules collapse under the high pressure of the writing implement, and the outflowing core material comes into contact with the recipient layer, so that a duplicate is produced. The recipient layer generally also contains binders and pigments, for example titania, chalk, talcum or zinc oxide.

In another arrangement of the components, the colour-conferring capsules and developers are present on the surface in one or more individual layers or have been incorporated into the paper pulp.

The production of microcapsules for reactive duplicating papers is described, for example, in U.S. Pat. No. 2,800,457, No. DE-B-1,122,495, Nos. DE-B-2,529,427, 2,757,528, 2,757,634 and 2,832,637, U.S. Pat. No. 3,016,308, No. CA-A-742,643, U.S. Pat. Nos. 3,575,882, 3,577,515 and 3,607,776 and Nos. DE-A-2,311,712, 2,655,048 and 2,738,509.

The colour formers of the formulae (I)–(IV) are preferably dissolved in solvents, and their solutions are then microencapsulated. Examples of suitable solvents are petroleum, kerosine, xylene, toluene and similar mineral oils as well as hydrogenated and partially hydrogenerated terphenyl, alkylnaphthalenes, alkylated diphenylalkanes, alkylated triphenylethanes, alkylated diphenyl and similar aromatic hydrocarbons, diisopropylbenzene, polyhalogenated paraffin or diphenyl, such as chloroparaffin, monochlorodiphenyl or trichlorodiphenyl, and also tricresyl phosphate, trichloroethyl phosphate, trichlorobenzene, benzyl phenyl ether, di-n-butyl phthalate, dioctyl phthalate, diphenyl ether, diarylalkanes and vegetable or animal oils.

Further examples of suitable solvents and/or extenders are paraffins, alkylbenzenes, for example dodecylbenzene, and olefines.

If polyisocyanates are used for preparing the microcapsules, it is possible first of all to dissolve the diisocyanate and the dyestuff precursor in solvents and to emulsify this organic phase in an aqueous phase which can contain protective colloids. To this emulsion is then added the aqueous polyamine solution in a stoichiometric amount.

To emulsify and stabilise the resulting emulsion, protective colloids and emulsifying aids are added to the aqueous phase.

Examples of these products acting as protective colloids are carboxymethylcellulose, gelatin and polyvinyl alcohol.

Examples of emulsifiers are ethoxylated 3-benzylhydroxybiphenyl, reaction products of nonylphenol with varying amounts of ethylene oxide and sorbitan fatty acid esters.

The microcapsules can be produced continuously or discontinuously. It is generally customary to use dispersing equipment which produces a shearing gradient. Examples thereof are vane, cage and high-speed stirrers, colloid mills, homogenisers, ultrasonic dispersers, nozzles, jet nozzles and Supraton machines. The degree of mixing turbulence primarily affects the diameter of the resulting microcapsules. Capsules of 1 to 2,000 um in size can be produced. Preferred capsules are 2 to 20 um in diameter. The capsules do not agglomerate, and they have a narrow particle size distribution. The weight ratio of core material to sheath material is (50-90):(50-10).

The microcapsule suspensions obtained as primary product generally contain 10 to 45% by weight of capsules. The homogenised capsule suspensions containing binder and if desired inert fillers, such as talcum or kaolin, can be applied to base paper in amounts of 4–8 g/m². The coating of base paper is described in Nos. DE-A 1,934,457 and 1,955,542.

The capsules are preferably fixed on the support by means of suitable binders. If paper is the preferred support material, the binders used are mainly paper-coating agents, such as starch or starch derivatives, methylcellulose, hydroxymethylcellulose, dextrin, gum arabic, casein or polymer latexes, such as, for example, butadiene-styrene copolymers or acrylic homopolymers or copolymers.

The paper used is not only of the standard type which includes cellulose fibres, but is also of the type in which the cellulose fibres are partly or wholly replaced by fibres made of synthetic polymers.

The novel colour formers of the formulae (I)–(IV) can also be used for the production of heat-sensitive recording media which are described for example in U.S. Pat. Nos. 2,172,507, 2,730,457, 3,539,375, 4,309,047 and 4,316,621.

They are produced by applying the colour formers, one or more recipients acting as electron acceptors and a binder jointly or severally in the form of a coating composition in one or more layers to a support made of paper, plastics film, textile fabric, synthetic paper, metal or glass.

The heat-sensitive recording media are used in telex machines, computers, printers, measuring instruments or other recording equipment. In recent equipment, the heat can also be generated by means of laser beams.

As the individual components soften or melt on exposure to heat, the colour former and the recipient react with each other to produce a colour.

The developers used are the same electron acceptors as used in pressure-sensitive papers. Examples of developers are clay minerals and phenolic resins or even phenolic compounds as described for example in No. DE-A 3,219,239.

The binders used are preferably water-soluble or -swellable film-forming and fusible products, for example methylcellulose, carboxymethylcellulose, hydroxyethylcellulose, gelatin, starch or starch derivatives, polyvinyl alcohol, polyacrylamide, polyvinylpyrrolidone or polyacrylic acid.

If the colour former and the developer are present in two separate layers, it is possible to use binders which are soluble in apolar or only weakly polar solvents, such as natural rubber, synthetic rubber, chlorinated rubber, alkyd resins, polystyrene, styrene-butadiene copolymers, polymethyl acrylates, ethylcellulose, nitrocellulose or polyvinylcarbazole.

The heat-sensitive layers can also contain additives such as inorganic or organic pigments, for example talc, titania, zinc oxide, calcium carbonate or clays or even organic pigments, for example urea-formaldehyde polymers, the whiteness and the printability of the papers being improved thereby.

Other fusible additives, such as carboxamide or urea derivatives, phthalic anhydride, metal stearates or natural or synthetic waxes ensure that colour development only takes place within sharply defined areas and that colour former and recipient melt as nearly as possible simultaneously and at a low temperature.

The novel colour formers of the formulae (I)–(IV) can also be used for producing electrothermal or electrostatic or light-sensitive recording media.

The "acid development hue" indicated in the following examples is obtained, unless otherwise stated, by applying a solution of the colour former in toluene to a paper and developing by adding acetic acid.

EXAMPLE 1

10.3 g (50 mmol) of 1-methylimidazo[1,5-a]pyridine dihydrochloride and 11.5 g (50 mmol) of 1-formylpyrene are intimately stirred at 100° C. together with 9.4 g (110 mmol) of piperidine and 0.3 ml of glacial acetic acid for 4 to 5 hours. The reaction mixture is taken up in 100 ml of warm toluene, and the pH is lowered to 8 by extracting with water. The organic phase is dried over MgSO₄ and is filtered, and the solvent is drawn off. The residue is recrystallised from toluene. The result is 10.6 g of a slightly yellow powder having a melting point of 191°–192° C. and the following formula:

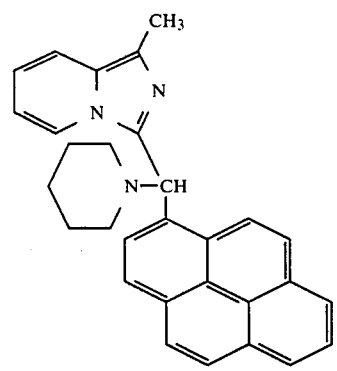

The development hue of this colour former in the acid pH range is violet. (Melting point: 191°–192° C.)

Using this method it is possible to prepare analogously, although the reaction at 100° C. may need to be longer, the following compounds:

EXAMPLE 2

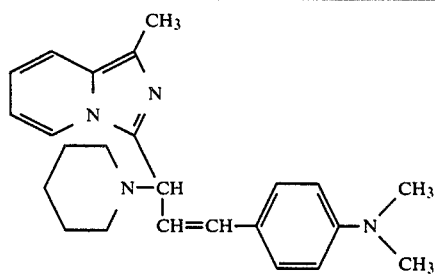

Acid development hue: bluish green

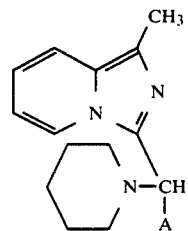

| Example | A | Acid development hue |
|---|---|---|
| 3 | 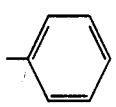 | yellow |
| 4 | 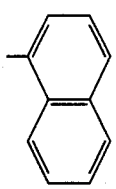 | yellow |
| 5 | 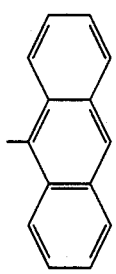 | yellow |
| 6 | 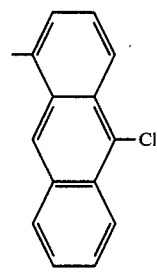 | orange |
| 7 | 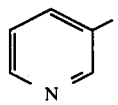 | yellow |
| 8 | 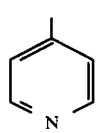 | yellow |
| 9 | 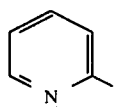 | yellow |
| 10 | 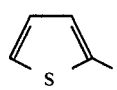 | orange |
| 11 | 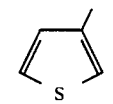 | orange |

The colour formers of Examples 1 to 11 can also be obtained using the method of Example 12:

EXAMPLE 12

10.3 g (50 mmol) of 1-methylimidazo[1,5-a]pyridine dihydrochloride, 7.5 g (50 mmol) of 4-ethoxybenzaldehyde, 9.4 g (110 mmol) of piperidine and 0.3 ml of glacial acetic acid are thoroughly stirred under reflux in 100 ml of toluene for 20 hours. The mixture is allowed to cool down and is extracted with water until the pH has dropped to 8. The organic phase is dried over $MgSO_4$ and is filtered, and the filtrate is evaporated to dryness in a rotary evaporator. After drying under a high vacuum the oily residue is made to crystallise by adding acetone. The result is 8.6 g of a greyish white crystalline powder having a melting point of 119°–120° C. and, according to analysis by NMR and mass spectroscopy, the following structure:

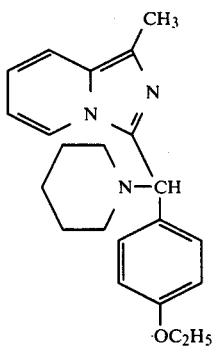

This colour former develops an orange hue under acid conditions. (Melting point: 114°–115° C.)

Using the method of Example 12 it is possible to prepare analogously, although the length of reaction may have to be extended up to 50 hours, colour formers (a) and (b):

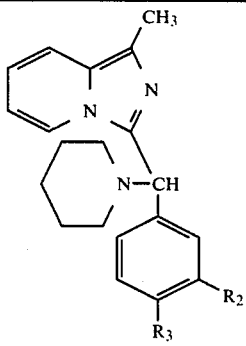
| Example | R₃ | R₂ | Acid development hue |
|---|---|---|---|
| 13 | —OCH₃ | —H | orange |
| 14 | —O—nC₈H₁₇ | —H | orange |
| 15 | —O—i-C₃H₇ | —H | orange-red |
| 16 | —OCH₂—C₆H₅ | —H | orange |
| 17 | —OCH₂—C₆H₅ | —OCH₃ | orange |
| 18 | —OCH₂CO₂CH₃ | —H | orange |
| 19 | —O-(2-pyridyl) | —H | yellow |
| 20 | —O—C₆H₅ | —H | yellow |
| 21 | —OCH₃ | —CH₃ | orange |
| 22 | —C₆H₅ | —H | yellow |
| 23 | —OCH₃ | —OCH₃ | orange |
| 24 | —S—C₆H₅ | —H | red |
| 25 | —CH=CH—C₆H₅ | —H | red |
| 26 | —N(CH₃)₂ | —H | blue |
| 27 | —N(C₂H₅)₂ | —H | blue |
| 28 | —N(CH₂CH₂CN)₂ | —H | violet |
| 29 | —N(CH₃)(C₆H₅) | —H | blue |

-continued
| | | | |
|---|---|---|---|
| 30 | —N(CH₃)—CH₂CH₂Cl | —H | blue |
| 31 | —N(CH₃)—CH₂CH₂CN | —H | blue |
| 32 | —N(C₂H₅)—CH₂CH₂OCO—C₆H₄—CO₂CH₃ | —H | bluish green |
| 33 | —Cl | —H | greenish yellow |
| 34 | 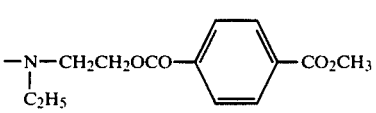 1-methyl-3-phenyl-4,5-dihydropyrazol-5-yl | —H | bluish green |
| 35 | 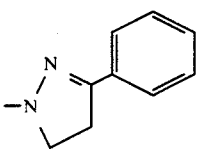 1-methyl-3-(biphenyl-4-yl)-4,5-dihydropyrazol-5-yl | —H | bluish green |
| 36 | 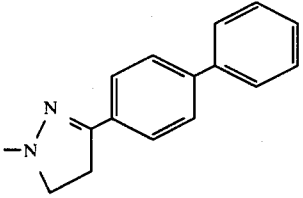 1-methyl-3-(4-chlorophenyl)-4,5-dihydropyrazol-5-yl | —H | bluish green |
| 37 | 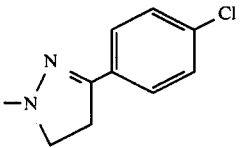 benzoxazol-2-yl | | red |
| 38 | 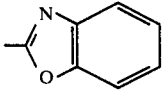 benzisoxazol-3-yl | —H | red |
| 39 | —CH₃ | —H | yellow |
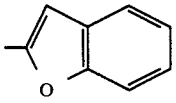
(b)
| Example | A | Acid development hue |
|---|---|---|
| 40 | 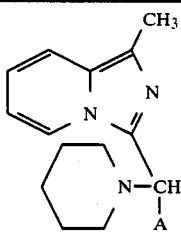 | |

| | | |
|---|---|---|
| 41 | 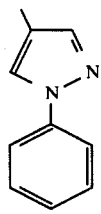 | yellow |
| 42 | 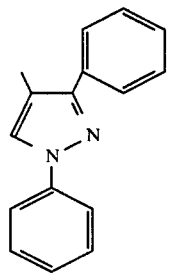 | orange |
| 43 | 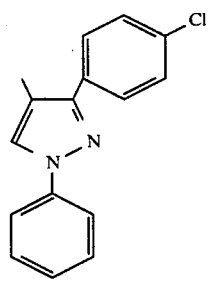 | orange |
| 44 | 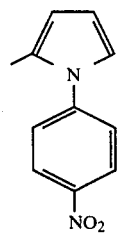 | red |

EXAMPLE 45

Production of a carbonless duplicating paper (a) Preparation of the microcapsule dispersion 6.25 g of the leuco compound prepared in Example 13 are dissolved in 161.1 g of a diisopropylated diphenyl by stirring and heating to 80° C., and, after the solution has cooled down to room temperature, 36.75 g of oxadiazinetrionedihexamethylene diisocyanate (NCO content 21.0%) and 40.4 g of isohexadecane are added in succession with stirring.

This organic solution is added to 385 g of an 0.5% strength aqueous solution of a partially hydrolysed polyvinyl acetate (degree of hydrolysis: 90%), and the mixture is turned into an emulsion having a droplet size of 6–8 μm by stirring at 15,700 revolutions per minute with a turbine mixer. To this emulsion are added with stirring 16.1 g of diethylenetriamine dissolved in 61.8 g of water. The resulting 35% strength microcapsule dispersion is stirred at 35° C. for 20 minutes and, after heating up, at 60° C. for 2 hours.

(b) Production of the duplicating paper

The microcapsule dispersion prepared in (a) is diluted with water to a capsule content of 15% by weight and is applied to a 50 g/m² base paper by means of a 30 μm doctor blade.

The paper is dried to form the top sheet of a carbonless duplicating paper.

A sample of the duplicating paper is laid with the microcapsule-coated side downward onto a commercially available recipient paper coated with acid clay (Giroset CF from Feldmühle), and 3 further sheets of paper are placed on top. This set of papers is inscripted with the letter "w" by means of a typewriter. A nonfugitive duplicate of the "w" in a deep orange colour appears on the recipient paper.

EXAMPLE 46

A microcapsule dispersion is prepared as in Example 45(a). The leuco dyestuff used is the compound described in Example 1. The paper is coated and inscripted analogously to Example 45(b). The result is a deep violet colour.

EXAMPLE 47

A microcapsule dispersion is prepared as in Example 45(a). The leuco dyestuff used is the compound described in Example 16. The paper is coated and inscripted analogously to Example 45(b). The result is a deep orange colour.

EXAMPLE 48

Production of a heat-sensitive recording sheet 3.6 g of an ester wax having a dewpoint of 79°–85° C. (Hoechst Wax E from Hoechst AG), 41 g of kaolin, 18 g of a partially hydrolysed polyvinyl alcohol (Mowiol 26–88 from Hoechst AG), 32 g of bis-(4-hydroxyphenyl)-dimethylmethane and 500 g of water are carefully ball-milled to a particle size of about 10 μm.

6 g of the leuco dyestuff prepared in Example 27, 3 g of a partially hydrolysed polyvinyl alcohol (Mowiol 26–88 from Hoechst AG) and 60 g of water are thoroughly mixed at 20,000 revolutions per minute using an Ultra-Turrax mixer until the dyestuff is in a state of fine division. The foam formed in the course of the mixing is destroyed by means of a few drops of tributyl phosphate.

The two dispersions are mixed with each other and the mixture is applied to a 50 g/m² base paper with a 30 μm doctor blade and is carefully dried. The weight of the coating is 5.0 g/m². Touching the coated paper with a hot needle produces a deep bluish green colour.

We claim:

1. A hetarylmethane leuco dyestuff of the formula

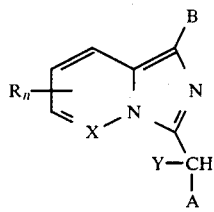

wherein

R denotes halogen, $C_1$–$C_5$-alkyl or $C_1$–$C_5$-alkoxy,

A denotes a phenyl, naphthyl, pyrenyl, anthracyl, perylenyl, biphenylyl, thienyl, pyrryl, imidazolyl, oxazolyl, thiazolyl, pyrazolyl, pyridyl, pyrimidyl, quinolyl, 1,2,3,4,-tetrahydroquinolyl, quinoxalyl, indolyl, 1,2-dihydroquinolyl or benzodioxolyl, B denotes hydrogen, halogen, $C_1$–$C_5$-alkyl, phenyl, $C_1$–$C_4$-alkylcarbonyl, benzoyl, mono- or di-$C_1$–$C_5$-alkylamino or phenylamino, X denotes CH, Y denotes

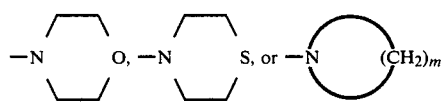

m denotes 4–6 and n denotes 0–4 the alkyl radicals and the cyclic radicals being unsubstituted or substituted by fluorine, chlorine, bromine, hydroxyl, $C_1$–$C_8$-alkoxy, phenoxy, benzyloxy, pyridyloxy, phenyl, pyrazolinyl, benzoxazolyl, benzofuranyl, triazolyl, $C_1$–$C_4$-alkylmercapto, phenylmercapto, benzylmercapto, cyano, carbamoyl, $C_1$–$C_4$-alkoxycarbonyl, amino, which in turn are unsubstituted or substituted by 1 or 2 $C_1$–$C_4$-alkyl, phenyl, benzyl or phenylethyl groups, $C_2$–$C_4$-alkenyloxy, $C_1$–$C_4$-alkylcarbonyloxy or benzoyloxy, or the cyclic radicals being substituted by nitro, $C_1$–$C_4$-alkyl, $C_2$–$C_6$-alkenyl or styryl.

2. Hetarylmethane leuco dyestuffs of the formula of claim 1 wherein

B = methyl and m = 5.

3. Hetylmethane leuco dyestuffs of the formula of claim 1 wherein

B = $CH_3$, m = 5, n = 0 or 1.

4. Hetarylmethane leuco dyestuffs of the formula

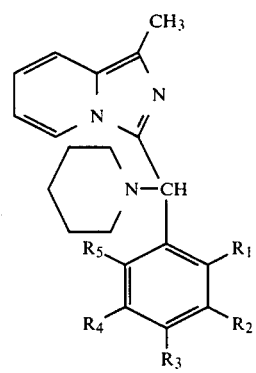

wherein $R_1$ and $R_5$ stand for hydrogen, $C_1$–$C_4$-alkyl, phenyl, benzyl, $C_1$–$C_4$-alkoxy, $C_2$–$C_4$-alkenyloxy, phenoxy, $C_1$–$C_4$-alkylcarbonyl, benzoyl, chlorine or bromine, $R_2$ and $R_4$ stand for hydrogen, $C_1$–$C_4$-alkyl, phenyl, benzyl, $C_1$–$C_4$-alkoxy, phenoxy, chlorine, bromine or amino which can be substituted by 1 or 2 $C_1$–$C_4$-alkyl, phenyl, benzyl or phenethyl groups, $R_3$ stands for hydrogen, $C_1$–$C_4$-alkyl, phenyl, benzyl, $C_1$–$C_8$-alkoxy, phenoxy, pyridyloxy, benzyloxy, phenylpyrazolinyl, chlorophenylpyrazolinyl, biphenylylpyrazolinyl, benzoxazolyl, benzofuranyl, 1,2,3-triazolyl, phenylvinyl, cyano, chlorine, bromine, $C_1$–$C_4$-alkoxycarbonyl, $C_1$–$C_4$-alkoxycarbonyl- or phenoxycarbonyl-$C_1$–$C_4$-alkoxy, nitro, amino which can be substituted by 1 or 2 $C_1$–$C_4$-alkyl, phenyl, benzyl or phenethyl groups and the radicals on nitrogen can in turn be substituted by chlorine, cyano or phenyl, or stands for $C_1$–$C_4$-alkylmercapto or phenylmercapto, or $R_1$ and $R_2$, together with the benzene ring to which they are bonded, stand for naphthyl or anthracyl, or $R_1$, $R_2$, $R_4$ and $R_5$, together with the benzene ring to which they are bonded, stand for optionally chlorine-substituted anthracyl, or $R_1$, $R_2$ and $R_3$, together with the benzene ring to which they are bonded, stand for pyrenyl, or $R_2$ and $R_3$, together with the benzene ring to which they are bonded, stand for benzodioxole.

5. Hetarylmethane leuco dyestuffs of the formula

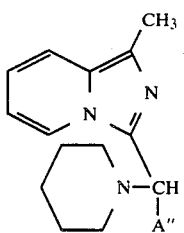

wherein

A" stands for the radicals

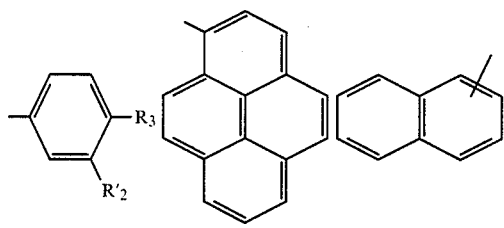

R'$_2$ stands for hydrogen, methoxy, ethoxy, methyl or ethyl,

Z stands for hydrogen or chlorine, and

R$_3$ is as defined in claim 4.

6. A hetarylmethane leuco dyestuff of the formula

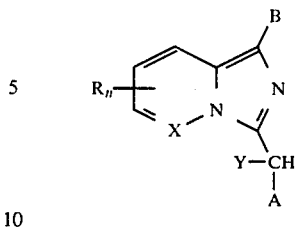

wherein

R denotes halogen, C$_1$–C$_5$-alkyl or C$_1$–C$_5$-alkoxy,

A denotes a phenyl, naphthyl, pyrenyl, anthracyl, perylenyl, biphenylyl, thienyl, pyrryl, imidazolyl, oxazolyl, thiazolyl, pyrazolyl, pyridyl, pyrimidyl, quinolyl, 1,2,3,4-tetrahydroquinolyl, quinoxalyl, indolyl, 1,2-dihydroquinolyl or benzodioxolyl, B denotes methyl, X denotes CH, Y denotes

R$_6$ denotes hydrogen or C$_1$–C$_8$-alkyl, and n denotes 0–4, and the alkyl radicals and the cyclic radicals being unsubstituted or substituted by fluorine, chlorine, bromine, hydroxyl, C$_1$–C$_8$-alkoxy, phenoxy, benzyloxy, pyridyloxy, phenyl, pyrazolinyl, benzoxazolyl, benzofuranyl, triazolyl, C$_1$–C$_4$-alkylmercapto, phenylmercapto, benzylmercapto, cyano, carbamoyl, C$_1$–C$_4$-alkoxycarbonyl, amino, which in turn are unsubstituted or substituted by 1 or 2 C$_1$–C$_4$-alkyl, phenyl, benzyl or phenylethyl groups, C$_2$–C$_4$-alkenyloxy, C$_1$–C$_4$-alkylcarbonyloxy or benzoyloxy, or the cyclic radicals being substituted by nitro, C$_1$–C$_4$-alkyl, C$_2$–C$_6$-alkenyl or styryl.

* * * * *

UNITED STATES PATENT AND TRADEMARK OFFICE
CERTIFICATE OF CORRECTION

PATENT NO. : 4,687,853

DATED : August 18, 1987

INVENTOR(S) : Hans-volker Runzheimer, et al.

It is certified that error appears in the above-identified patent and that said Letters Patent is hereby corrected as shown below:

| | |
|---|---|
| Col. 1, line 20 | Correct spelling of --denotes-- |
| Col. 2, line 33 | Delete "$R^1$" and substitute -- $A^1$ -- |
| Col. 2, line 37 | Correct spelling of --quinoxalyl-- |
| Col. 3, line 39 | Delete "strands" and substitute --stands-- |
| Col. 18, line 11 | Delete "Hetylmethane" and substitute --Hetarylmethane-- |

Signed and Sealed this

Twenty-sixth Day of April, 1988

Attest:

DONALD J. QUIGG

*Attesting Officer*     *Commissioner of Patents and Trademarks*